UNITED STATES PATENT OFFICE.

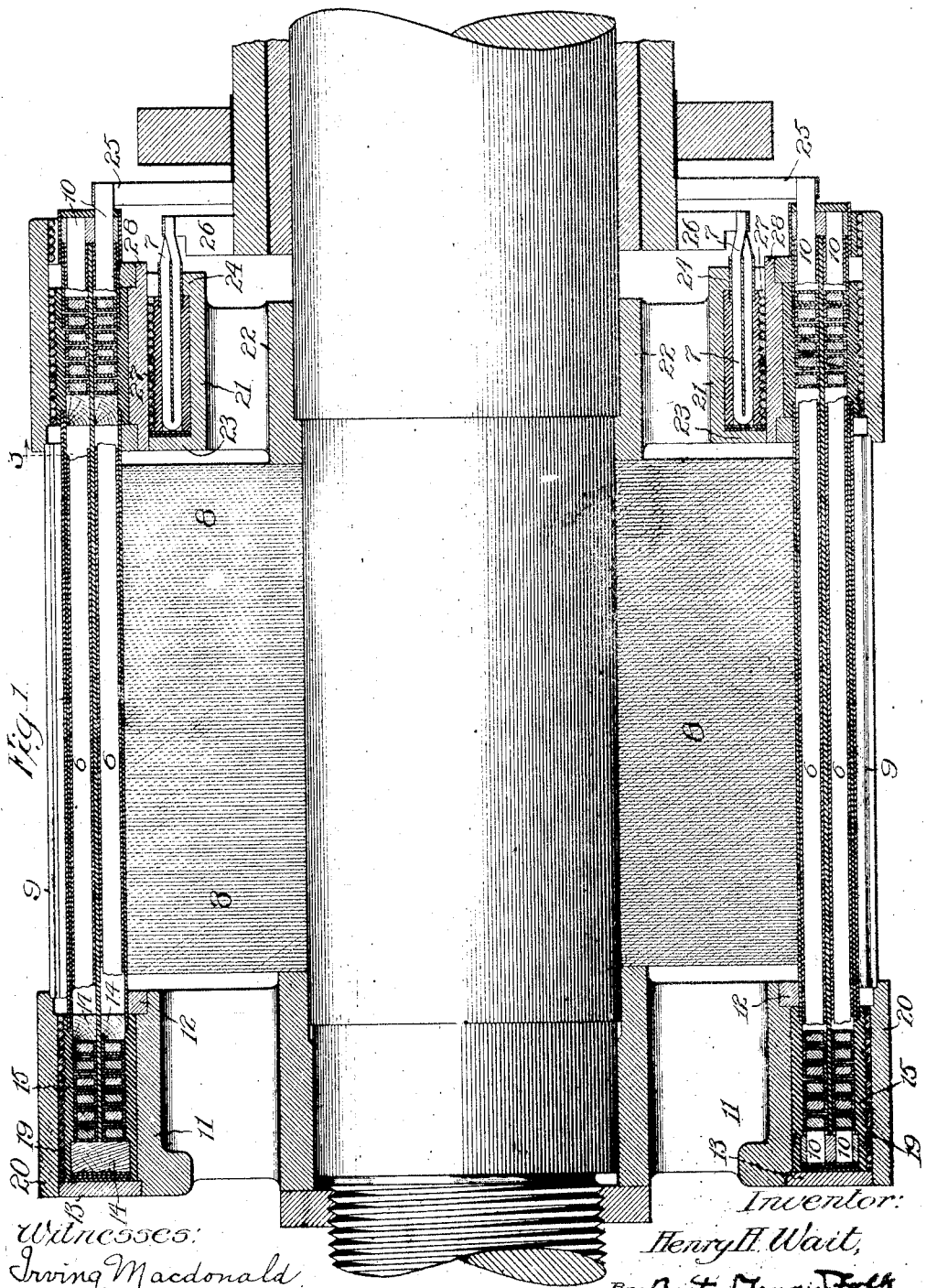

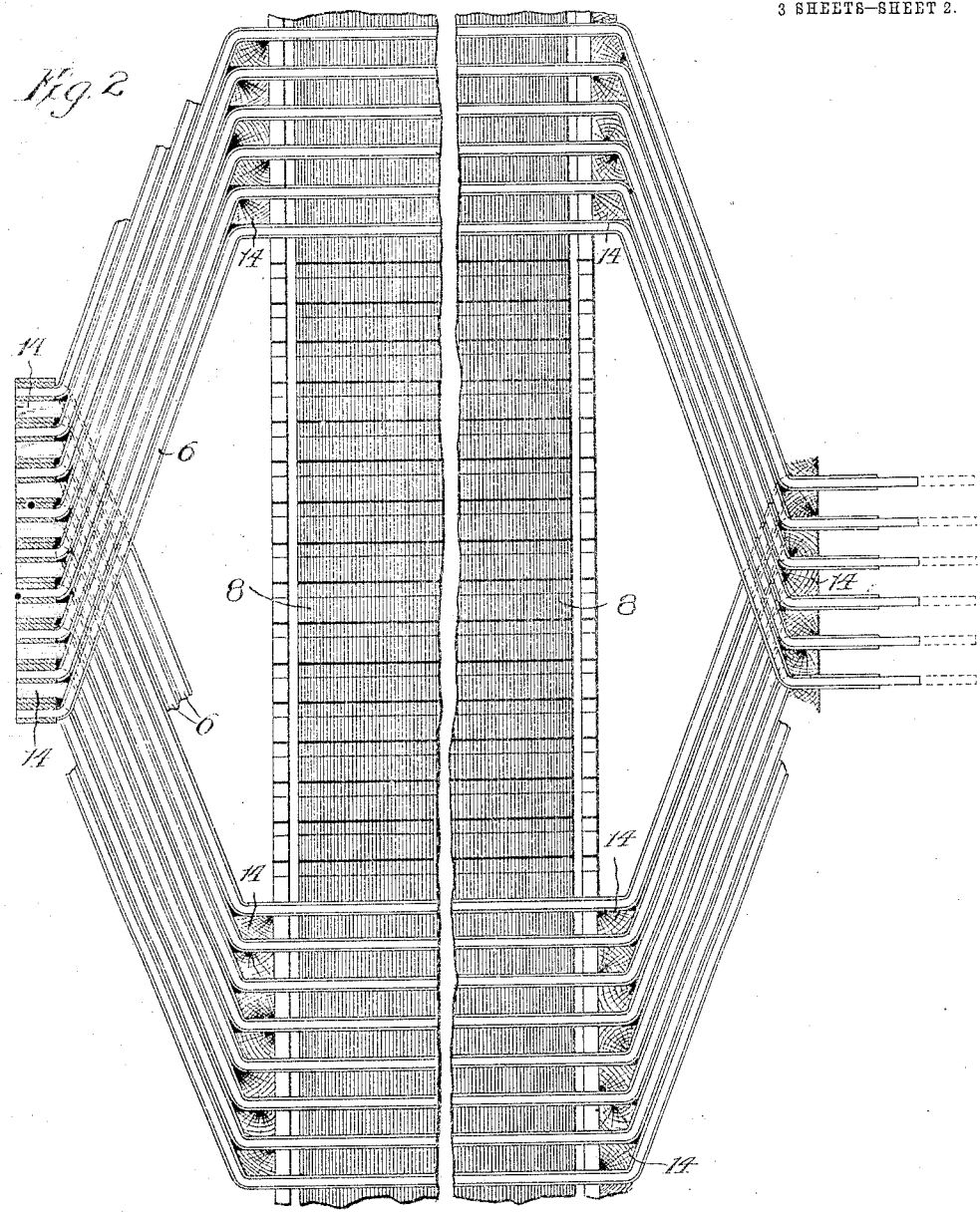

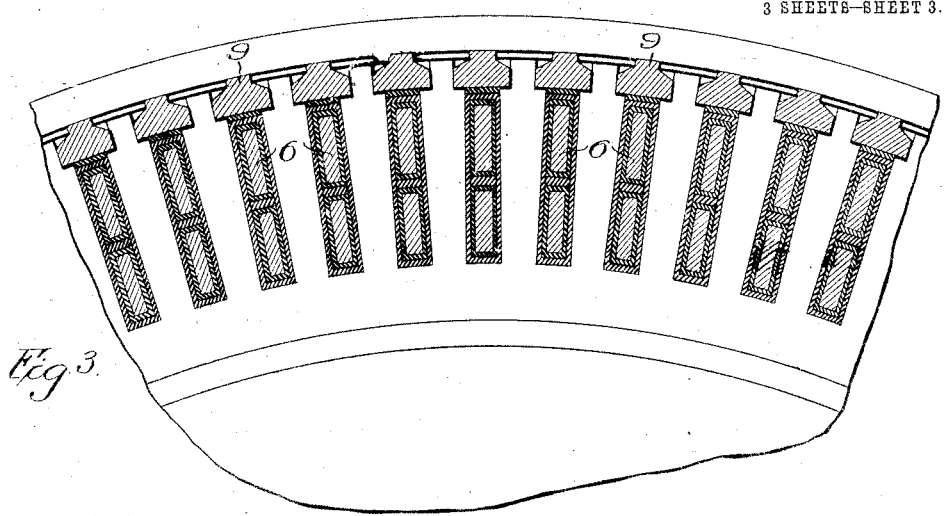
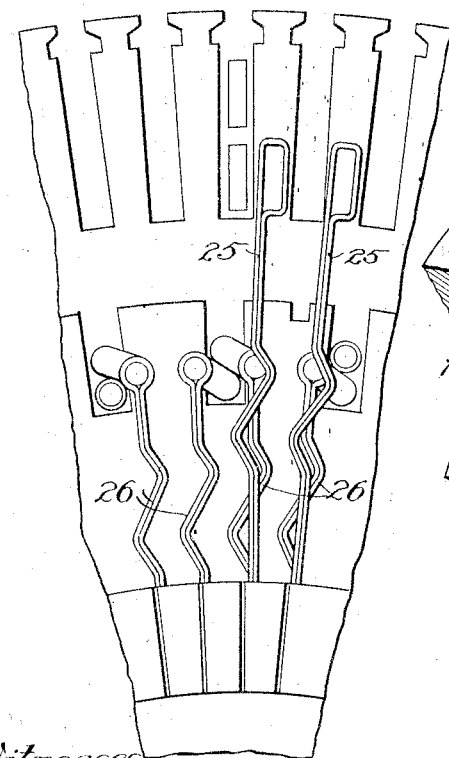
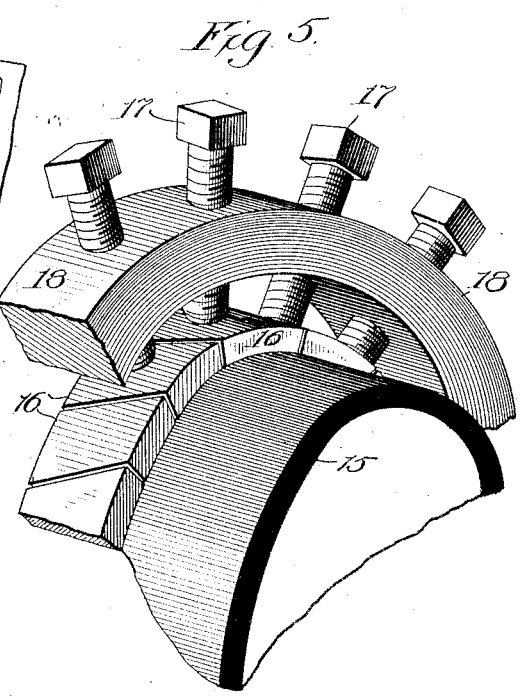

HENRY H. WAIT, OF CHICAGO, ILLINOIS.

ROTOR FOR HIGH-SPEED ELECTRICAL MACHINES.

980,032.  Specification of Letters Patent.  Patented Dec. 27, 1910.

Application filed March 11, 1907. Serial No. 361,681.

*To all whom it may concern:*

Be it known that I, HENRY H. WAIT, a citizen of the United States, residing at Chicago, in the county of Cook and State of Illinois, have invented certain new and useful Improvements in Rotors for High-Speed Electrical Machines, of which the following is a full, clear, concise, and exact description.

My invention relates to a rotor for high speed electrical machines, such as generators and motors, whether of the direct-current or alternating-current type, and its object is to provide an improved construction for the end portions of the rotor, with particular reference to the support of the end-connecting portions of the windings, so that they will not be subject to displacement by centrifugal force.

My invention also contemplates an improved arrangement of the equalizer winding in the armatures of direct-current machines.

In the construction of the rotating parts of generators which are intended to be driven by turbine engines, one of the greatest difficulties is due to the necessity of insulating the copper windings from the core and from the other metallic supports for these windings. When the machines are put into service there is a tendency for this insulation to be compressed more or less under the centrifugal and other strains, and give rise to some movement of the conductors, with the result of throwing the rotor out of balance. It is the purpose of this invention to overcome these difficulties by providing such support for the windings that their displacement under operating conditions will be practically impossible.

In the accompanying drawings, Figure 1 is a longitudinal sectional view of a rotor embodying my invention; Fig. 2 is a diagram illustrating a portion of the winding developed into a plane and showing insulating blocks which are forced into the open spaces to assist in holding the end-connections against displacement; Fig. 3 is a fragmentary cross-sectional view of a portion of the rotor, taken at line 3 of Fig. 1; Fig. 4 illustrates the connections from the commutator segments to the main and equalizer windings; and Fig. 5 illustrates a means of compressing the insulating material which is placed around the end-connecting portions of the winding.

Like parts are designated by similar characters of reference throughout the several views.

The rotor shown in the drawings is an armature for a four-pole direct-current generator and is provided with main windings 6 and equalizing connections 7, uniting those commutator segments which are intended to be maintained at the same potential.

In accordance with my invention, the windings are blocked and wedged in place, with all available space between and around the conductors filled with insulating material and the whole is then placed under compression as strong or stronger than the centrifugal forces which the structure will have to withstand in service, this compression being maintained by metal retaining bands and wedges.

The main windings 6 are placed in slots in the core 8 in the manner usual for the barrel type of winding, except that the insulation is made of material which is as little compressible as possible. The insulating material which I preferably employ is mica, protected at its sides by compressed fiber board. In the core portion, the windings may be compressed in their slots by means of set screws, such as shown in Fig. 5, acting on steel blocks in the tops of the slots, and fiber or other wedges 9 are driven in lengthwise of the slots under the shoulders at the ends of the core-teeth, to maintain the pressure upon the windings as the steel compression blocks are removed.

The end-connecting portions 10 of the winding are contained in annular chambers at the ends of the rotor formed by hub-portions 11, 28 and rings 12, 13 mounted thereon. The outer ring 13 at the end of the rotor is solid, to completely close said end, while the ring 12 next the core is slotted in a manner similar to the core-disks to permit the windings to pass through. As the conducting bars are placed upon the armature, the open spaces in the annular chambers containing the end-connections are filled with filler-blocks 14 forced into place. A thick layer 15 of micanite or other slightly plastic insulating material is then placed over the windings and subjected to compression, as by the apparatus shown in Fig. 5. Sectional compression blocks 16 are placed around the ends of the armature over the insulating material and engaged by set screws 17 mounted in a ring 18. The rotor is then heated in an oven to slightly soften the insulating material and the screws tightened to subject the insulation material to very heavy pressure so that it is made to flow sufficiently to fill up all unevenness and open spaces. Then when the rotor is taken out of the oven, the ring 18 being first to cool, shrinks so as to still further increase the compression. As the rotor body cools, the set screws can be further tightened. The compression is thus repeated several times with heating and cooling until the head of the winding is molded into a very compact mass. When the compression has been carried as far as possible in this manner, the clamping rings are taken off and the exterior of the material is turned off true and metallic bands 19 placed around the end portions to hold the material during further manipulation. These bands may be of iron or steel wire and when in place are turned off almost but not quite flush with the peripheral edges of the end rings 12, 13, after which the heavy bronze or non-magnetic steel retaining-rings 20 are put on while heated and shrunk into place. The intermediate bands 19 serve not only to retain the winding while the rotor is being completed, but also to protect the insulating material from being blistered or charred while the heated retaining rings 20 are being set. By making the bands 19 project slightly above the end supports 12, 13, the shrinkage of the retaining rings will practically remove any slight expansion which may have occurred when the clamp rings 18 were taken off, and will set up a compression on the heads of the winding greater than that which results from the centrifugal force to which the rotor is subjected in service.

It will be seen that the end connections with the insulating material therefor thus form a solid mass, compressed within the annular connection box, which is formed by a central supporting drum, end plates thereon, and a retaining ring supported concentrically at both ends by said end plates. The toothed rings 12 which form the inner ends of the box allow the conductor bars to be led from the core to the box through the slots between the teeth, while said teeth form rigid radial supporting members for the retaining band, which is shrunk into very tight engagement therewith. This construction successfully prevents even very slight displacement of the end-connections or retaining bands. Such displacement has been difficult if not impossible to avoid heretofore by reason of the enormous centrifugal strains which are set up in a rotor turning at high speed, and a displacement of even a few thousandths of an inch will throw the rotor out of balance and cause serious vibration. It will also be noted that the box containing the end-connections is surrounded by free air-space, to keep the end-connections sufficiently cool without allowing dust and dirt to be blown into them. Preferably a free space is left between the main body 8 of the core and the inner end-plates of the connection-boxes, in order to allow free circulation of air.

Another feature of the construction is that the windings where they pass out of the head or chamber at the commutator end are so disposed and insulated that they will not be liable to be short-circuited by dirt which tends to be driven outwardly from the shaft by centrifugal fan action and to accumulate on the inner surfaces of projecting parts. The conductor bars are protected by insulating tubes, and the radially-innermost conductor in each slot rather than the outermost is the one which is connected to the commutator tang. The end of the retaining ring is separated from the conductors by a wide radial surface of insulating material against which dirt cannot lodge, and the insulating tubes surrounding the inner conductor bars prevent short circuits in the corners where they emerge from the head.

The armature shown in the drawing is provided with equalizing connections 7, which are disposed in a concentric channel or annular chamber radially inside the main windings; and these equalizing connections are compressed and secured against centrifugal strains in a manner similar to that above-described for the main windings. These equalizing windings will be set in place before the main windings are applied. The annular channel for their reception is composed of a cylindrical bed-plate 21 carried by the spider 22, and end-plates or rings 23, 24 forming the ends of the chamber, the inner ring being solid and the outer ring slotted to permit the conductors to pass out and make connection to the commutator. The commutator segments have two different sets of tangs 25, 26, one set being connected to the main armature conductors and the other set to the equalizer conductors. This provision of separate tangs facilitates the successive connection of the equalizing and main windings and also affords additional radiating surface to carry away the heat from the commutator parts. The tangs 26 for the equalizing windings extend radially from the commutator, immediately in front of the hollow or open space in the supporting drum 21, so that said tangs act as fan blades to cause an active circulation of air radially outward from such space.

In assembling the rotor, the equalizing connections are first applied, being covered with insulating material which is subjected to repeated compression in the manner described with reference to the insulating material covering the main windings, and a band 27 which may be of steel wire is then placed about the insulation and turned off almost but not quite flush with the edges of the supporting end plates 23 24. The heavy retaining-ring 28 is then placed over said band 27 while heated, and shrunk into place, setting up a very heavy compression upon the insulating covering of said equalizing windings. The retaining ring 28 when cooled is then turned off true, to form the seat or bottom of the annular chamber which is to receive the end-connecting portions of the main winding, said main winding being then applied in the manner already described.

I claim:—

1. A rotor for high speed electrical machines comprising a core, windings on said core, end connections for said windings, and an annular connection-box at the end of the rotor in which said end connections are disposed, said connection box comprising a hollow central supporting drum, end plates supported upon said drum at both ends thereof, and a retaining ring fitted upon said end plates and supported thereby, the end-plate nearest the core being slotted for the passage of the windings.

2. A rotor for high-speed electrical machines, said rotor having annular chambers in the end portions thereof, windings having their end connecting portions disposed in said annular chambers and insulating material under heavy compression surrounding said windings and forming therewith a complete solid filling in said chambers, retaining bands covering said chambers, and heavy solid metal retaining rings shrunk on outside said bands.

3. A rotor for high speed electrical machines comprising a core, windings thereon, an annular connection-chamber at the end of the core receiving the end-connections of said winding, said chamber being formed by a hollow supporting drum, upon which the end-connections are compressed, supporting rings closing the chamber at each end, the inner ring being slotted for the passage of the winding, a retaining ring supported rigidly upon said rings, and insulating material surrounding the end connections in said chamber and forming a solid filling therefor.

4. In a rotor for high-speed electrical machines, the combination with a core having windings thereon, of an annular connection-box at the end of said core, said box comprising a central hollow supporting drum against which the end-connections of the winding are compressed, end plates closing the ends of said box, and a retaining ring shrunk upon said end-plates; said box being separated from the body of the core by a ventilating space.

5. A head for the rotor of a high-speed electrical machine comprising a central supporting drum, windings disposed around said drum, insulating material compressed outside of said windings, a metallic band maintaining a preliminary compression on said insulating material, and a retaining ring placed around said preliminary band under pressure.

6. An armature for high-speed dynamos having a drum at the commutator end thereof, equalizer windings placed around said drum and covered by insulating material, a retaining cylinder surrounding the insulation outside said equalizer windings, and plates forming with said cylinder an outer concentric chamber, windings having their end connections disposed in said chamber, insulating material surrounding said windings and forming therewith a complete solid filling for said chamber, and a retaining ring surrounding the insulation outside of said windings.

7. An armature for high-speed electrical machines having a shaft, a core, a main winding on said core, an equalizing winding supported concentrically inside the end-connecting portions of said main winding; a commutator the segments whereof have tangs connected to said main winding and separate tangs extending radially to connect with said equalizing windings, said equalizing winding being supported at a distance from the central shaft, leaving an open space in front of which the radial tangs are disposed to act as centrifugal fan blades.

8. An armature having an end connecting box, armature bars projecting from said box and surrounded by insulating tubes, said bars being arranged in a plurality of concentric sets, a commutator, tangs connecting the radially-innermost armature bar with the commutator segments, said connecting-box including a metal retaining ring forming the outer cylindrical wall thereof, a radial insulating surface being provided between the exposed surface of the armature bars and said retaining ring.

In witness whereof, I, hereunto subscribe my name this 2nd day of March A. D., 1907.

HENRY H. WAIT.

Witnesses:
DE WITT C. TANNER,
ALFRED H. MOORE.